United States Patent
Fletcher

(10) Patent No.: US 6,691,774 B2
(45) Date of Patent: Feb. 17, 2004

(54) HEAT EXCHANGER FABRICATION BY POLYMER EXTRUSION AND STRUCTURES FORMED THEREBY

(75) Inventor: Eldon Lawrence Fletcher, Kingston, CA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/251,489

(22) Filed: Sep. 20, 2002

(65) Prior Publication Data

US 2003/0056369 A1 Mar. 27, 2003

Related U.S. Application Data

(60) Provisional application No. 60/324,004, filed on Sep. 21, 2001.

(51) Int. Cl.[7] .................................................. F28F 1/00
(52) U.S. Cl. ........................ 165/177; 165/133; 165/910; 29/890.053
(58) Field of Search ............................... 165/171, 177, 165/133, 905, 910; 29/890.053

(56) References Cited

U.S. PATENT DOCUMENTS

| | | | |
|---|---|---|---|
| 3,277,959 A | 10/1966 | Withers | |
| 4,702,311 A | 10/1987 | Bizard | |
| 5,181,562 A * | 1/1993 | Kuriki | 165/166 |
| 5,469,915 A * | 11/1995 | Cesaroni | 165/171 |
| 5,499,676 A * | 3/1996 | Cesaroni | 165/166 |
| 5,509,472 A * | 4/1996 | Tamura et al. | 165/171 |
| 2003/0094264 A1 * | 5/2003 | Bergevin | 165/133 |

FOREIGN PATENT DOCUMENTS

| | | | |
|---|---|---|---|
| DE | 3152899 A1 | 8/1983 | |
| DE | 4217923 A1 * | 12/1993 | 165/171 |
| EP | 010871 A1 * | 5/1980 | 165/171 |
| EP | 572187 A2 * | 12/1993 | 165/177 |
| EP | 673496 B1 | 6/1998 | |
| FR | 2787875 A1 | 6/2000 | |
| WO | WO 00/53992 | 9/2000 | |

* cited by examiner

*Primary Examiner*—Terell McKinnon

(57) ABSTRACT

A process for making a multilayer plastic tube heat exchanger with a ribbon of molten polymer being poured over layers of tubes, and then another layer of tubes being added and another ribbon of polymer. Heat exchanger structures so formed are also disclosed.

5 Claims, 2 Drawing Sheets

HEAT EXCHANGER FABRICATION BY POLYMER EXTRUSION AND STRUCTURES FORMED THEREBY

CROSS REFERENCE TO RELATED APPLICATIONS

This application claims the benefit of U.S. Provisional Application No. 60/324,004 filed Sep. 21, 2001.

FIELD OF THE INVENTION

This invention relates to processes for the manufacture of plastic tube bundles useful for heat exchangers. More particularly, this invention relates to such processes incorporating polymer to affix such tubes into desired positions.

BACKGROUND OF THE INVENTION

Many heat exchangers are constructed from tubes and tube sheets. Tube sheets are essentially flat sheets provided with holes to admit the tubes. In assembly of the heat exchanger, tubes are inserted into these holes and are then bonded to the tube sheet, by brazing or other methods in the case of metal cores, or by thermal bonding processes involving melting in the case of plastic cores. The process of inserting small diameter, thin wall plastic tubes into the holes of the tube sheet, also known as threading, can be mechanically demanding and can limit the rate of heat exchanger production and economic attractiveness.

Alternatively, in the case of plastic cores, the tube sheet can be formed by stacking a number of saddle-like layers. Each element is bonded to the adjacent element(s) by a thermal process such as vibration or ultrasonic welding. Such a process is described in EP 0 673 496 B1. While this process avoids the need for a threading step, the mechanical strength of the resulting tube sheet is limited by the number and quality of the individual bonds required to build the tube sheet.

It is an object of the present invention to provide a process for the fabrication of plastic tube bundles for heat exchangers which is adaptable to incorporate a variety of shapes of tubes. A feature of the present invention is the improved speed of fabrication of the heat exchanger assembly versus conventional techniques. It is an advantage of the present invention to provide a process that does not require acute positioning of the tubes prior to securing them together. These and other objects, features and advantages will become apparent upon having reference to the detailed description herein.

SUMMARY OF THE INVENTION

The present invention provides a process for fabricating a plastic tube bundle for a heat exchanger structure comprising:
  providing a layer of polymeric tubes having a plurality of tubes held in proximity and side by side to each other,
  pouring molten polymer over the tubes sufficient to embed the tubes therein,
  positioning an additional layer of such tubes on the polymer while said polymer is still soft, so that the tubes are embedded in the layer,
  pouring additional molten polymer over the additional layer of tubes,
  repeating the last two steps at least once to form a bundle,
  cooling said bundle to harden the polymer, and
  fashioning the tube bundles including the ends of the tubes encased in said polymer to communicate with one or more headers to collect heat exchange fluid.

DETAILED DESCRIPTION OF THE INVENTION

Figure 1:
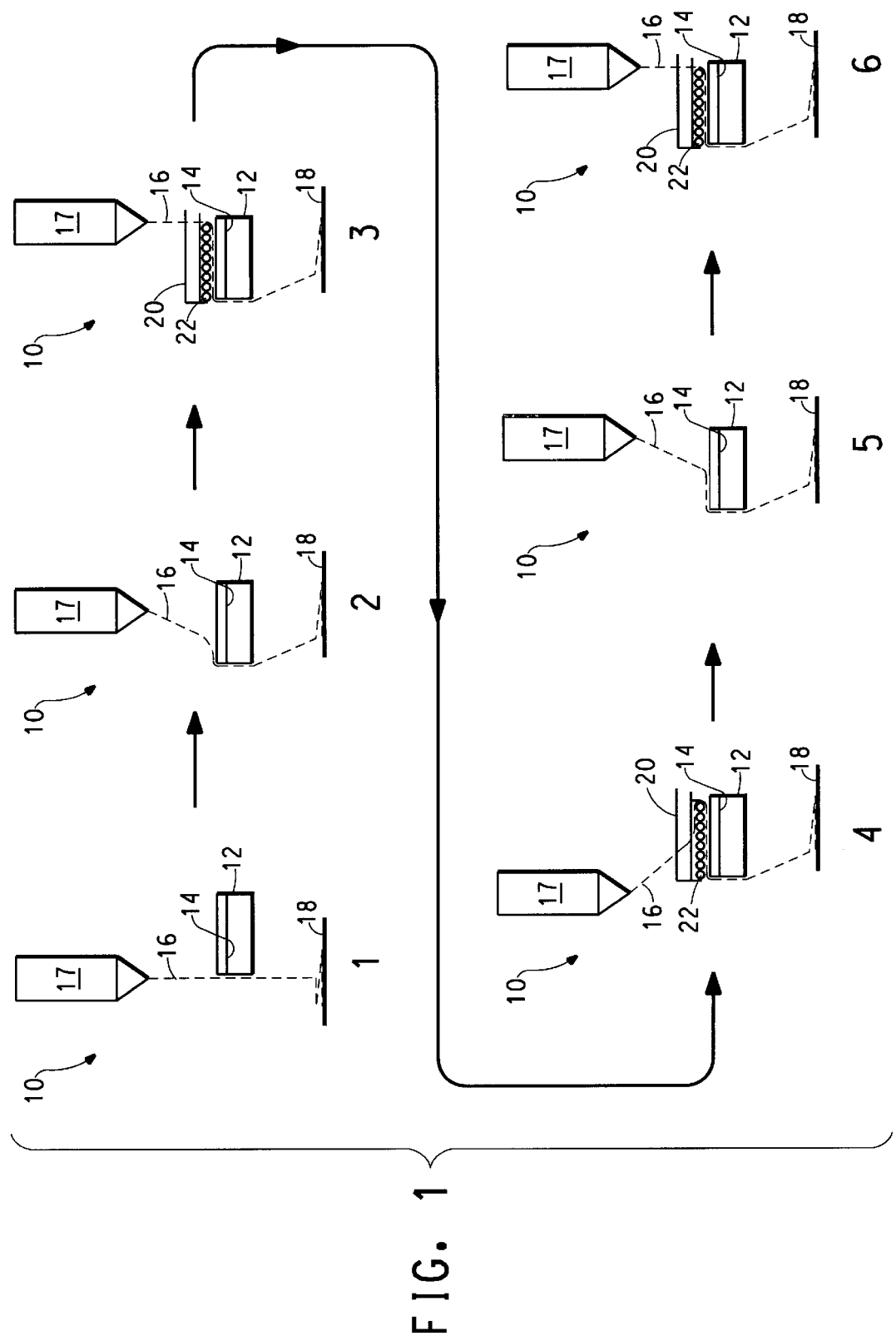
FIG. 1 shows the heat exchanger fabrication sequence of the instant invention, including apparatus useful therefor.

Having reference to FIG. 1, the exchanger fabrication process is illustrated generally at 10 in a series of sequences. The key piece of equipment is the exchanger mould 12. It is a metal box, the size of the finished exchanger, and has a movable inside plate 14. The mould 12 can be water cooled if necessary.

Sequence (1) shows the polymer (in this case, formed as a ribbon 16) being extruded from the extrusion die 17 into the waste tray 18, the exchanger mould 12 in position with the movable inside plate 14 at the top.

Sequence (2) shows the exchanger mould 12 traversing into the polymer ribbon 16 and a layer of polymer being put down on inside plate 14.

Sequence (3) shows the tube transfer mechanism 20 positioning the tubes 22 over the mould 12.

Sequence (4) shows the mould 12 traversing to the right to encase the tubes 22 while they are being held in position by the transfer mechanism 20.

Sequence (5) shows the mould 12 traversing to the left while the inside plate 14 is indexed down one tube layer. The tube transfer mechanism 20 is being refilled.

Sequence (6) shows the next layer of tubes 22 being put into position ready to be encased by the polymer ribbon 16 as the exchanger mould 12 traverses to the right.

The process is repeated until the desired number of tube layers have been laid down and sufficient polymer ribbon 16 laid down to complete the exchanger. The exchanger mould 12 is then indexed out of the path of the polymer, the exchanger is allowed to solidify, and is then pushed up out of the mould 12 by the inside plate 14 and removed. In a production facility it would preferable to have two moulds 12 side by side that could be indexed so that as one exchanger is cooling, the other mould 12 is being filled. The process would be continuous.

Figure 2:
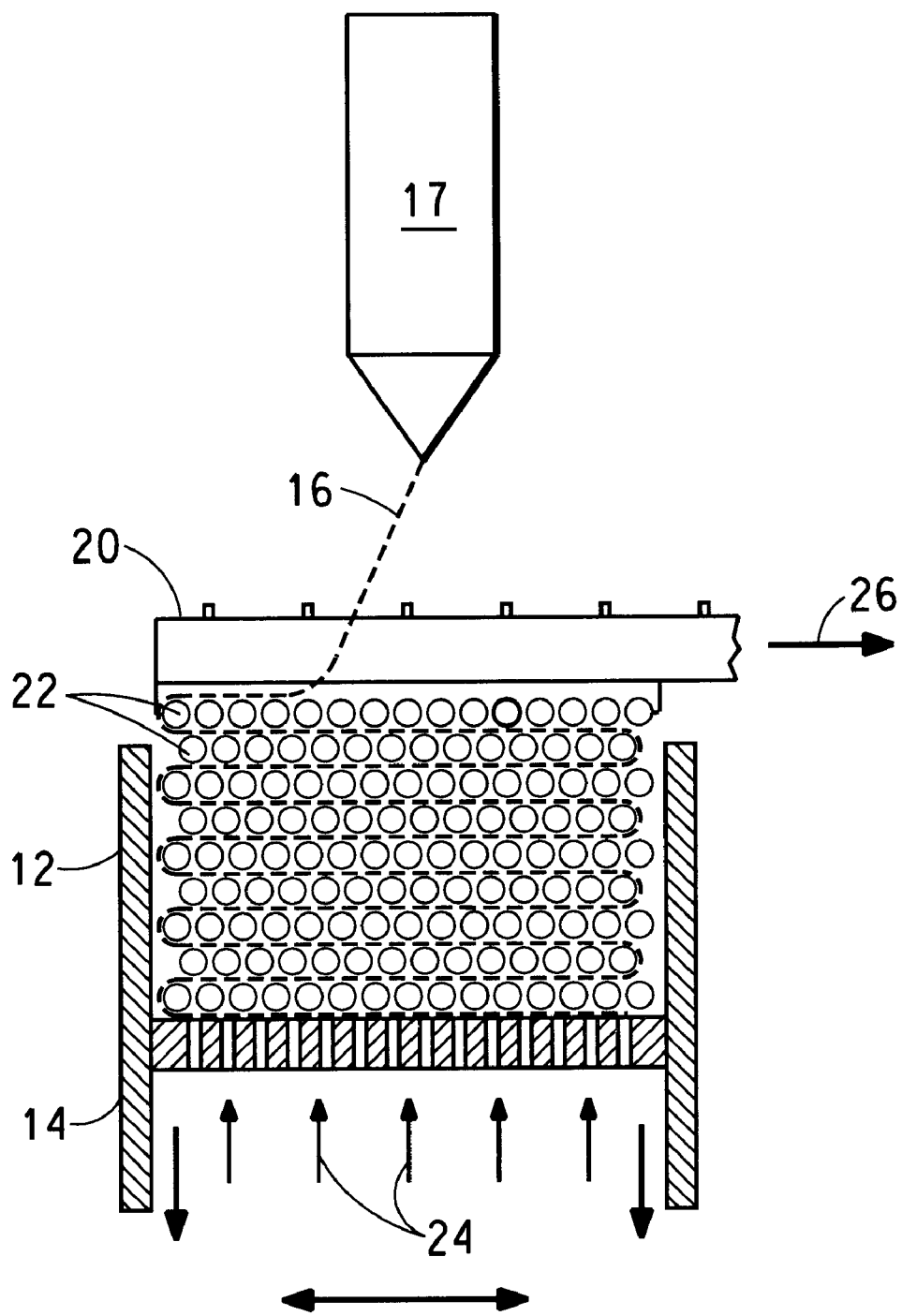
FIG. 2 shows a side view of the apparatus depicted in FIG. 1.

FIG. 2 shows a side view of the process depicted in FIG. 1. It is readily seen that as the Sequences (1)–(6) as above are repeated, a heat exchanger including multiple layers of tubes 22 encased in polymer ribbon 16 is formed. Cooling air (depicted by arrows 24) may be applied towards or through inside plate 14. Moreover, a vacuum (depicted by arrow 26) may also be applied in the vicinity of the next layer of tubes 22 (eg those of Sequence (6)) using conventional means.

It will be readily appreciated by those having skill in the art that any number of variations and adaptations on the process techniques described herein may be introduced, and these are contemplated as within the scope and purview of this invention. For example, a supply hopper may be added to the assembly, filled with precut tubing. This hopper may be vibrated if necessary to assist in feeding. The tubing exits the hopper into the tubing transfer mechanism 20, which has grooves to receive the tubes 22. The aforementioned vacuum is applied to the mechanism so that the tubes 22 are held into grooves set into the transfer mechanism 20. The transfer mechanism 20 is traversed under the hopper until all the grooves are filled, then retracted and inverted, the tubes 22 being held in position by the vacuum. The end sections of the tubes 22 may pass through a treatment zone of either flame or a mixed gas plasma discharge (such equipment is made by "Enercon") which is not shown.

A preferred technique for laydown of the polymer onto the tubes 22 is to fashion the polymer as a ribbon 16. For example, the polymeric ribbon 16 may generally be sized to cover all or a significant portion or a desirable portion of the tubes 22. The ribbon bonding of tubing presents the opportunity to simplify heat exchanger core manufacture by elimination of the need for injection moulding tube sheets and the need for threading and bonding large numbers of small tubes into prefabricated holes. It creates a system that can form an exchanger from non-round tubes with profiles such as oval or triangular.

The key to this process would be the choice of materials and the control of temperatures. The polymer of the ribbon 16 has to be of sufficient fluidity to flow around the tubes 22 but have sufficient viscosity as to not flow too much latterly before solidifying. The latteral flow can be controlled by the ribbon extrusion temperature, the mould temperature, and the cooling air rate and temperature. The temperature of the ribbon 16 can be lower than the melting point of the tubes 22 but the closer to that point the bonding is better. The flame or plasma treatment of the tubes 22 is very important in order to get a good bond.

If the tubes 22 are nylon 66, or nylon 66 coated, then nylon 6 is a good candidate for the material of the ribbon 16.

The invention will become better understood upon having reference to the following example.

EXAMPLE

In this example a simple apparatus was constructed, generally as depicted in FIGS. 1 and 2. The mould has a platform or bottom, which is movable downward. The mould was traversed back and forth under the molten polymer ribbons building up a layer of polymer. Then a layer of tubes was added and the mould was traversed under the ribbons so the tubes were encapsulated in polymer, the platform was indexed down one tube layer thickness, and another tube layer placed on top. This layer was encapsulated in polymer by traversing the mould under the ribbons. This was repeated until all the tube layers had been laid down, then the mould was traversed several more times to build the polymer layer up. The mould was withdrawn from under the ribbons, and after a short cooling period the tube bundle was removed, and quenched further in cold water. The water was blown off. Spacer bars which had held the tube layers, were removed. The ends were cut off on a band saw, then smoothed using a high-speed edger or planer.

The resulting heat exhanger included 7 layers of 24 tubes each, for at total of 168 tubes (each having an outer diameter 3.7 mm and a wall thickness 0.2 mm). This assembly had the following dimensions: 160 mm in width and 50 mm in thickness, with an average width of each encapsulating layer (meaning the width of the ribbon itself) of 10 mm. Each tube was 180 mm in length. The tubes were made of Zytel® 42A polyamide 6—6 (available from E. I. DuPont de Nemours &

Co.) and the encapsulating polymer was nylon 6 available from BASF as Ultramid BS700-A.

The polymer supply was from a conventional 30 mm extruder equipped with a 229 mm flat film die which was deckled off so as to give 12.7 mm wide ribbons at each end.

Apparatus used in the process described herein should preferably incorporate a mechanical traversing device whose stroke length and rate are controllable and adjustable. Additional equipment considerations include a positive indexing device for the mould platform, a tube placement device, a tube end positioning device, and a top mould plate which is positioned to shape the molten polymer after the encapsulation is completed.

The system also preferably incorporates a treatment zone where the ends of the tubing in the region where the ribbon is to adhere are treated by a mixed gas plasma discharge. Flame treatment can be more difficult to control.

Instead of a conventional extrusion die to make the ribbon, one can use a couple of heated tubes to convey the polymer. The exit shape may not be that important, i.e. a round hole may be adequate.

If it is desirable to provide support to the tubing between the ends (eg for prevention of tube vibration or flutter), three, four or any number could be used. For example, molten polymer may be put down at selected intermediate locations in addition to locations near the tube ends to provide additional support to the tube bundle.

What is claimed is:

1. A process for fabricating a plastic tube bundle for a heat exchanger structure comprising:

forming a layer of polymeric tubes having a plurality of tubes held in proximity and side by side to each other, pouring molten polymer over the tubes sufficient to embed the tubes therein, positioning an additional layer of such tubes on the polymer while said polymer is still soft, so that the tubes are embedded in the layer, pouring additional molten polymer over the additional layer of tubes, repeating the last two steps at least once to form a bundle, said bundle being allowed to cool to harden the polymer, and fashioning the tube bundles including the ends of the tubes encased in said polymer to communicate with one or more headers to collect heat exchange fluid.

2. The process of claim 1 wherein the polymer of the tubes and the ribbon are both polyamide, with the tubes having a higher melting point than the ribbon polymer.

3. The process of claim 1 wherein the ends of said tubes are treated with a mixed gas plasma discharge prior to the addition of molten polymer thereon.

4. The process of claim 1 wherein said molten plymer is poured in a ribbon configuration over said tubes.

5. A heat exchanger structure formed using the process of claim 1.

* * * * *